United States Patent
Zhao et al.

(10) Patent No.: US 7,624,081 B2
(45) Date of Patent: Nov. 24, 2009

(54) PREDICTING COMMUNITY MEMBERS BASED ON EVOLUTION OF HETEROGENEOUS NETWORKS USING A BEST COMMUNITY CLASSIFIER AND A MULTI-CLASS COMMUNITY CLASSIFIER

(75) Inventors: Qiankun Zhao, Singapore (SG); Tie-Yan Liu, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 11/392,987

(22) Filed: Mar. 28, 2006

(65) Prior Publication Data

US 2007/0239677 A1    Oct. 11, 2007

(51) Int. Cl.
  *G06F 15/18*  (2006.01)
  *G06E 3/00*  (2006.01)
  *G06G 7/00*  (2006.01)
(52) U.S. Cl. ............................................ 706/20; 707/3
(58) Field of Classification Search .................. 706/20; 707/3
  See application file for complete search history.

(56) References Cited

U.S. PATENT DOCUMENTS

| | | | | |
|---|---|---|---|---|
| 5,867,799 | A * | 2/1999 | Lang et al. | 707/1 |
| 6,263,434 | B1 * | 7/2001 | Hanna et al. | 713/156 |
| 6,453,307 | B1 * | 9/2002 | Schapire et al. | 706/12 |
| 6,839,680 | B1 * | 1/2005 | Liu et al. | 705/10 |
| 7,457,794 | B2 * | 11/2008 | Weigt et al. | 706/47 |
| 2001/0037317 | A1 * | 11/2001 | Freiwirth et al. | 705/74 |
| 2004/0236576 | A1 * | 11/2004 | Thiesson et al. | 704/255 |
| 2005/0177385 | A1 * | 8/2005 | Hull et al. | 705/1 |
| 2006/0235810 | A1 | 10/2006 | Wen et al. | |

OTHER PUBLICATIONS

Nie, Z., Zhang, Y., Wen J. and Ma, W. "Object-Level Ranking: Bringing Order to Web Objects", WWW 2005, pp. 567-574.*
McCallum et al. "Efficient clustering of high-dimensional data sets with application to reference matching", SIGKDD, 2000, pp. 169-178.*
"Social Networks Research Report", http://tidbit.wildbit.com, 2005.*
Zaiane et al. "Discovering Web access patterns and trends by applying OLAP anddata mining technology on Web logs", Research and Technology Advances in Digital Libraries, 1998, pp. 19-29.*

(Continued)

*Primary Examiner*—David R Vincent
*Assistant Examiner*—Li-Wu Chang
(74) *Attorney, Agent, or Firm*—Perkins Coie LLP

(57) ABSTRACT

A community mining system analyzes objects of different types and relationships between the objects of different types to identify communities. The relationships between the objects have an associated time. The community mining system extracts various features related to objects of a designated type from the relationships between objects of different types that represent the evolution of the features over time. The community mining system collects training data that indicates extracted features associated with members of the communities. The community mining system then classifies an object of the designated type as being within the community based on closeness of the features of the object to the features of the training data.

13 Claims, 13 Drawing Sheets

OTHER PUBLICATIONS

Uzzi, "Social structure and competition in interfirm networks: the paradox of embeddedness", Administrative Science Quarterly, vol. 42, 1997.*

U.S. Appl. No. 11/375,610, filed Mar. 13, 2006, Liu et al.

Adamic, Lada A. and Eytan Adar, "Friends and Neighbors on the Web," TR HP, 2001, 9 pages.

Allan, James, Courtney Wade and Alvaro Bolivar, "Retrieval and Novelty Detection at the Sentence Level," SIGIR'03, Jul. 2003, Toronto, Canada, © 2003 ACM, pp. 314-321.

Beeferman, Doug and Adam Berger, "Agglomerative clustering of a search engine query log," SIGKDD 2000, 10 pages.

Bondy, J.A. and U. S. R. Murty, "Ch.9.2 Dual Graphs," Graph Theory With Applications, 1976, American Elsevier Publishing Co., Inc., pp. 139-143.

Cai, Deng et al., "Mining Hidden Community in Heterogeneous Social Networks," LinkKdd'05, Aug. 2005, Chicago, © 2005 ACM, 8 pages.

Chen, Chaomei and Les Carr, "Trailblazing the Literature of Hypertext: Author Co-Citation Analysis (1989-1998)," Hypertext 99, Darmstadt, Germany, © 1999 ACM, pp. 51-60.

Cui, Hang et al., "Probabilistic Query Expansion Using Query Logs," WWW 2002, May, Honolulu, Hawaii, ACM, pp. 325-332.

Flake, Gary William, Steve Lawrence and C. Lee Giles, "Efficient Identification of Web Communities," ACM SIGKDD 2000, August, Boston, MA, pp. 150-160.

Fonseca, Carlos M. and Peter J. Fleming, "Multiobjective Optimization and Multiple Constraint Handling with Evolutionary Algorithms I: A Unified Formulation," Jan. 23, 1995, IEEE TSMC, 40 pages.

Gibson, David, Jon Kleinberg and Prabhakar Raghavan, "Inferring Web Communities from Link Topology," HyperText 98, Pittsburgh, PA, © 1998 ACM, pp. 225-234.

Hopcroft, John et al., "Natural Communities in Large Linked Networks," SIGKDD '03, Aug. 2003, Washington, DC, © 2003 ACM, 6 pages.

Ino, Hidehiko, Mineichi Kudo and Atsuyoshi Nakamura, "Partitioning of Web Graphs by Community Topology," WWW May 2005, Chiba, Japan, ACM, pp. 661-669.

Jeh, Glen and Jennifer Widom, "SimRank: A Measure of Structural-Context Similarity," SIGKDD, 2002, pp. 1-11.

Joachims, Thorsten, "Making Large-Scale SVM Learning Practical," Jul. 9, 1998, pp. 41-56.

Joachims, Thorsten, "Optimizing Search Engines using Clickthrough Data," SIGKDD 2002, Alberta, Canada, © 2002 ACM, 10 pages.

Joachims, Thorsten, "SVMlight Support Vector Machine," Jul. 20, 2004, 10 pages, http•//www.cs.cornell.edu/People/tj/svm_light/, [last accessed Feb. 20, 2006].

Kautz, Henry, Bert Selman and Mehul Shah, "ReferralWeb: Combining Social Networks and Collaborative Filtering," Communications of the ACM, vol. 40, No. 3, Mar. 1997, pp. 1-4.

Keogh, Eamonn, "Exact Indexing of Dynamic Time Warping," In VLDB 2002, Hong Kong, 12 pages.

Kleinberg, Jon M., "Hubs, Authorities, and Communities," ACM Computing Surveys, vol. 31 (4), Dec. 1999, © 1999 by the Association for Computing Machinery, Inc., 4 pages.

Kumar, Ravi et al., "The Web and Social Networks," Computer, Nov. 2002, © 2002 IEEE, pp. 32-36.

Kumar, Ravi et al., "Trawling the web for emerging cyber-communities," 1999, 21 pages.

Li, Wen-Syan et al., "Retrieving and Organizing Web Pages by 'Information Unit'," WWW May 2001, Hong Kong, ACM, pp. 230-244.

Li, Xiaoyan and W. Bruce Croft, "Novelty Detection Based on Sentence Level Patterns," CIKM '05, Oct. 2005, Germany, © 2005 ACM, 8 pages.

Nie, Zaiqing et al., "Object-Level Ranking: Bringing Order to Web Objects," WWW 2005, Japan, ACM, pp. 567-574.

Popescul, Alexandrin et al., "Clustering and Identifying Temporal Trends in Document Databases," IEEE Advances in Digital Libraries, ADL 2000, Washington, DC, May 22-24, 2000, pp. 173-182.

Reddy, P. Krishna and Masaru Kitsuregawa, "An approach to build a cyber-community hierarchy," WISE, 2001, pp. 1-12.

Reddy, P. Krishna and Masaru Kitsuregawa, "An approach to relate the web communities through bipartite graphs," WISE 2001, pp. 1-10.

Schwartz, Michael F. and David C. M. Wood, "Discovering Shared Interests Among People Using Graph Analysis of Global Electronic Mail Traffic," Oct. 1992, Communications of the Association for Computing Machinery, 15 pages.

Shi, Jianbo and Jitendra Malik, "Normalized Cuts and Image Segmentation," Nov. 16, 1999, IEEE Transactions on Pattern Analysis and Machine Intelligence, vol. 22, No. 8, Aug. 2000, © 2000 IEEE, pp. 888-905.

Soundararajan, Padmanabhan and Sudeep Sarkar, "Investigation of Measures for Grouping by Graph Partitioning," In CPR 2001, © 2001 IEEE, pp. 1239-1246.

Sun, Aixin and Ee-Peng Lim, "Web Unit Mining: Finding and Classifying Subgraphs of Web Pages," In CIKM 2003, New Orleans, © 2003 ACM, 8 pages.

Sun, Jian-Tao et al., "CubeSVD: A Novel Approach to Personalized Web Search," WWW May 2005, Chiba, Japan, ACM, 9 pages.

Sun, Zhen et al., "Event-Driven Document Selection for Terrorism Information Extraction," ISI 2005, pp. 1-12.

Toyoda, Masashi and Masaru Kitsuregawa, "Extracting Evolution of Web Communities from a Series of Web Archives," HT'03, Aug. 2003, United Kingdom, © 2003 ACM, 10 pages.

Wen, Ji-Rong, Jian-Yun Nie and Hong-Jiang Zhang, "Clustering User Queries of a Search Engine," WWW, May 2001, Hong Kong, ACM, pp. 162-168.

Xue, Gui-Rong et al., "IRC: An Iterative Reinforcement Categorization Algorithm for Interrelated Web Objects," ICDM 2004, 8 pages.

Xue, Gui-Rong et al., "Optimizing Web Search Using Web Clickthrough Data," CIKM, ACM, Nov. 2004, pp. 118 - 126.

Yang, Yiming et al., "Topic-conditioned Novelty Detection," SIGKDD'02, Alberta, © 2002 ACM, pp. 688-693.

Zhang, Jian, Zoubin Ghahramani, and Yiming Yang, "A Probabilistic Model for Online Document Clustering with Application to Novelty Detection," NIPS 17, 2005, 8 pages.

Zhou, Wen-Jun et al., "A Concentric-Circle Model for Community Mining in Graph Structures," Nov. 15, 2002, Microsoft Technical Report MSR-TR-2002-123, 8 pages.

Cui, "Query Expansion by Mining User Logs," IEEE, 1041-4347/03, pp. 829-839.

* cited by examiner

PREDICTING COMMUNITY MEMBERS BASED ON EVOLUTION OF HETEROGENEOUS NETWORKS USING A BEST COMMUNITY CLASSIFIER AND A MULTI-CLASS COMMUNITY CLASSIFIER

BACKGROUND

Various attempts have been made to mine community information from web pages using data mining techniques. For example, "community mining" may identify web sites that share certain common characteristics wherein the identified web sites are the members of a community. Community mining techniques may model web data using a graph with vertices representing web pages or web sites and edges representing relationships between the web pages or web sites. Community mining techniques use different definitions of the characteristics of the member of a community. For example, one community mining technique defines a community as a set of web sites that has more links to members of the community than to non-members. That community mining technique may use a maximum flow/minimum cut approach to identify subgraphs that satisfy the definition. Another technique defines a community as a dense directed bipartite subgraph that contains a complete bipartite subgraph of a certain size. Another well-known technique for ranking web pages, the Hyperlink-Induced Topic Search ("HITS") technique, defines a community as a set of authority web pages linked to by important hub web pages that share a common topic. In the area of social network analysis, one community has been defined as users who share common interests based on their electronic mail communications. Another community mining technique defines a community based on popularity of different types of objects calculated using a graph with vertices representing heterogeneous objects. Some community mining techniques have identified communities based on evolution of web data over time. These techniques compare the data at different time points using dynamic metrics such as growth rate, novelty, and stability.

One example of community mining is the HITS technique, which is based on the principle that web pages will have links to (i.e., "outgoing links") important web pages. Thus, the importance of a web page is based on the number and importance of other web pages that link to that web page (i.e., "incoming links"). The HITS technique is additionally based on the principle that a web page that has many links to other important web pages may itself be important. Thus, HITS divides "importance" of web pages into two related attributes: "hub" and "authority." Hub is measured by the "authority" score of the web pages that a web page links to, and "authority" is measured by the "hub" score of the web pages that link to the web page. The HITS technique calculates importance based on a set of web pages and other web pages that are related to the set of web pages by following incoming and outgoing links. The HITS technique submits a query to a search engine service and uses the web pages of the results as the initial set of web pages. The HITS technique adds to the set those web pages that are the destinations of incoming links and those web pages that are the sources of outgoing links of the web pages of the result. The HITS technique then calculates the authority and hub score of each web page using an iterative algorithm.

Typical community mining techniques use either dynamic web data or heterogeneous web data. Dynamic web data refers to the analysis of the evolution of web data as it changes over time. Heterogeneous web data refers to web data representing different types of objects. These community mining techniques, however, do not use both dynamic and heterogeneous web data to identify communities.

SUMMARY

A method and system for identifying a community of objects of a designated type based on dynamic and heterogeneous data is provided. A community mining system analyzes objects of different types and relationships between the objects of different types to identify communities. The relationships between the objects have an associated time. The community mining system extracts various features related to objects of a designated type from the relationships between objects of different types that represent the evolution of the features over time. The community mining system collects training data that indicates extracted features associated with members of the communities. The community mining system then classifies an object of the designated type as being within the community based on closeness of the features of the object to the features of the training data. The community mining system can automatically identify communities of objects based on the relationships between heterogeneous objects and the dynamic nature of the relationships over time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
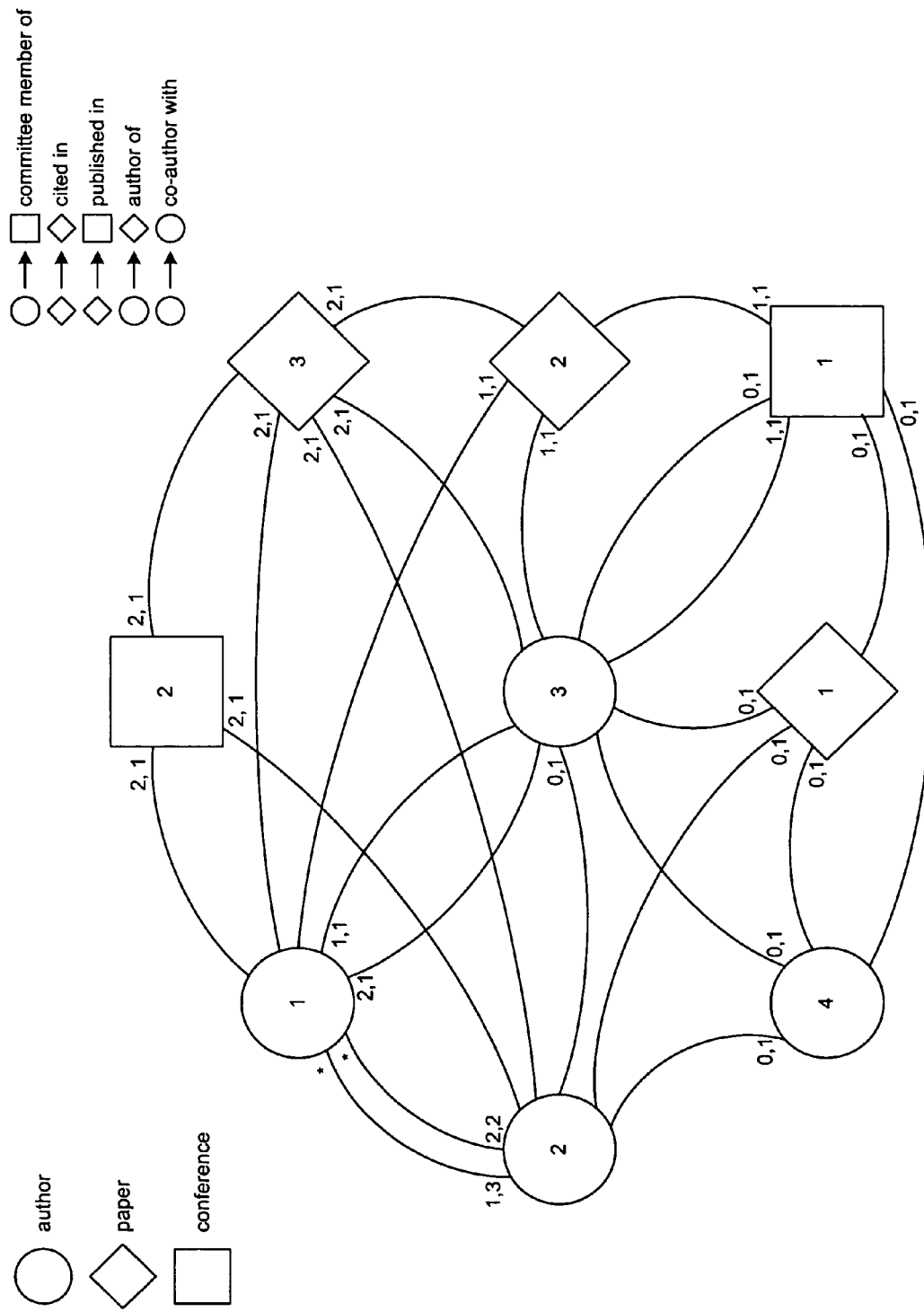
FIG. 1 illustrates an example heterogeneous graph generated by the community mining system.

A method and system for identifying a community of objects of a designated type based on dynamic and heterogeneous data is provided. In one embodiment, a community mining system analyzes objects of different types and relationships between the objects of different types to identify communities. For example, the community may be a group of persons who are potential committee members for a conference. The different object types may be person, paper, and conference and the relationships between the object types may indicate that a person was a committee member of a conference and a person was an author of a paper. The relationships between the objects have an associated time. For example, a relationship indicating that a paper was presented at a conference has the time of the conference associated with it. Also, a relationship indicating that a person was a co-author with another person has the time of the co-authored paper associated with it. The community mining system extracts various features related to objects of a designated type from the relationships between objects of different types that represent the evolution of the features over time. For example, the extracted features for a person may include the conferences at which the person was a committee member for various years. The community mining system collects training data that indicates extracted features associated with members of the communities. For example, the training data for the community of potential committee members for a conference includes the features of past committee members of the conference. The community mining system then classifies an object of the designated type as being within the community based on closeness of the features of the object to the features of the training data. For example, the community mining system may extract features for various persons and compare those features to the training data comprising features of past committee members of a conference. In this way, the community mining system can automatically identify communities of objects based on the relationships between heterogeneous objects and the dynamic nature of the relationships over time.

In one embodiment, the community mining system identifies potential committee members of a conference by analyzing persons, papers, and conferences and their relationships. The community mining system initially collects data on conferences from various data sources such as publication portals and community-related web pages. Examples of publication portals are the ACM Digital Library, the IEEE Explorer, the Digital Bibliography Library Project, and the CiteSeer collection. Examples of community-related pages are conference program committee pages, journal editorial board pages, and special interest group pages such as SIGMOD, SIGGRAPH, and SIGIR. The community mining system identifies objects such as persons, papers, journals, and conferences and their relationships over time. The relationships may indicate that a person was a committee member of a conference, a paper was cited in another paper, a paper was published at a conference, a person was an author of a paper, a person was a co-author with another person, a person was a referee of a journal, and so on.

After identifying the objects and relationships, the community mining system creates a heterogeneous graph that represents the objects and their relationships. A heterogeneous graph includes a vertex for each identified object and an edge for each identified relationship at each time period. For example, two authors may be co-authors of two papers in one year and of three papers in the next year. In such a case, the heterogeneous graph would include a vertex for each author with two edges between the vertices, one for each year. Each edge is associated with a time period and a weight. For example, the weight may indicate the number of papers that the connected persons co-authored during that time period. FIG. 1 illustrates an example heterogeneous graph generated by the community mining system. The vertices of the graph are represented by circles, diamonds, and squares, which represent authors, papers, and conferences, respectively. In this example, the community mining system generated the graph based on the data of Table 1 and Table 2. This example includes four authors, three papers, and two conferences. Table 1 indicates for each paper its authors, the conference and year at which it was published, and the other papers that include citations to it. For example, paper 2 was authored by authors 1 and 3, was published at conference 1 in year 1, and was cited by paper 3. The relationship that paper 2 was authored by authors 1 and 3 is represented by the edges between the diamond 2 and the circles 1 and 3. Each edge has a pair of numbers associated with it that indicate the year and the weight. For example, the edge between diamond 1 and circle 3 has the pair (0,1), which indicates year 0 and weight 1. The edges between circles 1 and 2 that are indicated by an asterisk are not represented in the data of Tables 1 and 2 but are included to illustrate vertices connected by more than one edge with weights greater than 1. For example, the pairs of the edges are (1,3) and (2,2), which indicate that in year 1 authors 1 and 2 co-authored three papers and in year 2 authors 1 and 2 co-authored two papers.

TABLE 1

| Paper | Authors | Conference | Year | Cited In |
|---|---|---|---|---|
| 1 | 2, 3, 4 | 1 | 0 | |
| 2 | 1, 3 | 1 | 1 | 3 |
| 3 | 1, 2, 3 | 2 | 2 | |

Table 2 indicates for each conference the year of the conference and the authors that were committee members at that conference. For example, conference 1 in year 1 had author 3 as a committee member.

TABLE 2

| Conference | Year | Author |
|---|---|---|
| 1 | 0 | 3, 4 |
| 1 | 1 | 3 |
| 2 | 2 | 1, 2 |

Figure 2:
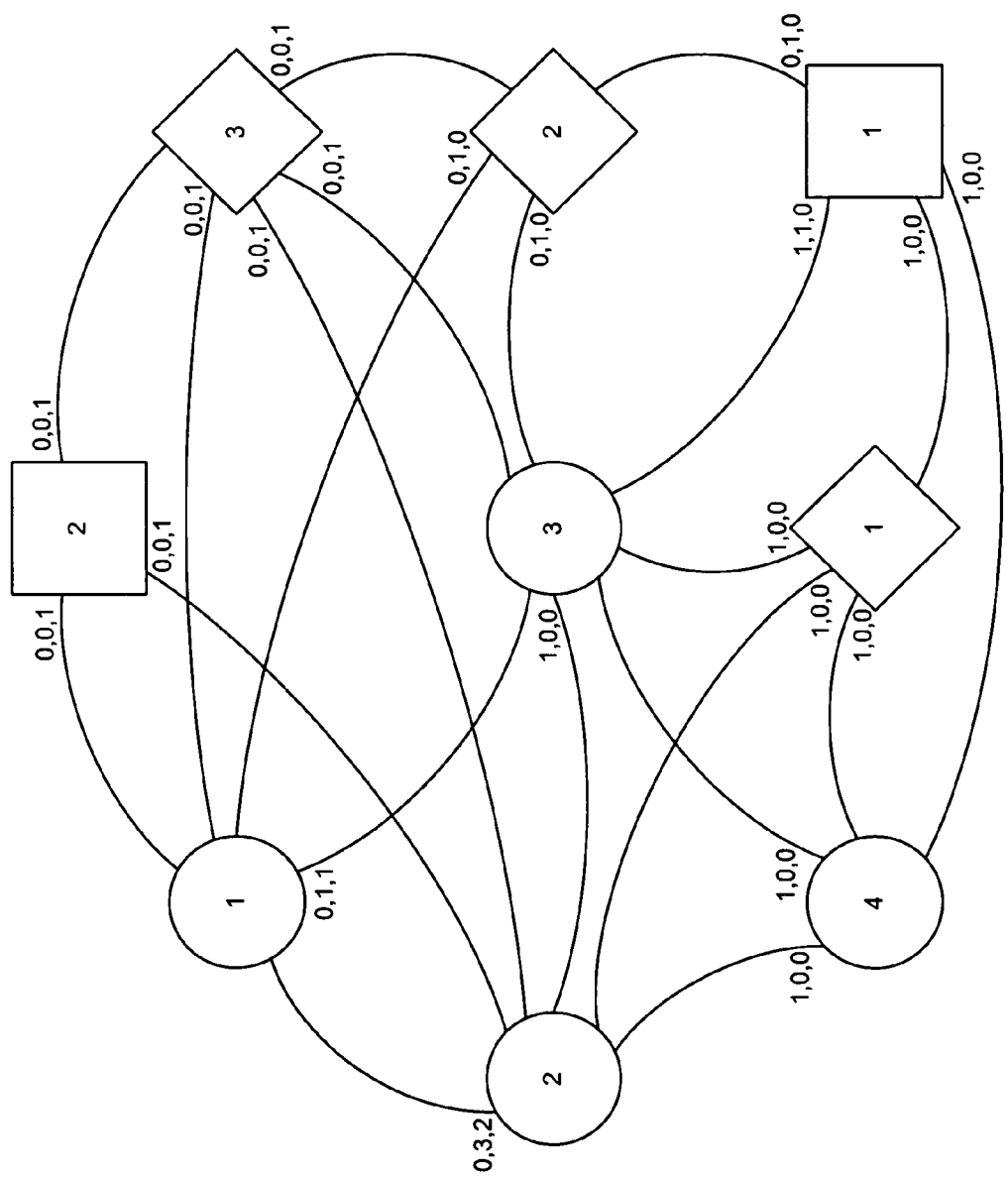
FIG. 2 illustrates a time vector heterogeneous graph derived from the heterogeneous graph of FIG. 1.

After generating the heterogeneous graph, the community mining system identifies a time vector heterogeneous graph from the heterogeneous graph. A time vector heterogeneous graph contains the same vertices as the heterogeneous graph. The time vector heterogeneous graph, however, has only one edge representing a type of relationship between each pair of vertices. In particular, if a pair of vertices in the heterogeneous graph had multiple edges between them representing different time periods for the same type of relationship, then the time vector heterogeneous graph would have only one edge between the vertices representing that type of relationship. Each edge, however, is associated with a time vector representing the weight of that relationship between the vertices over time. Thus, the time vector heterogeneous graph uses a vector associated with edges to represent the evolution of the relationships over time. FIG. 2 illustrates a time vector heterogeneous graph derived from the heterogeneous graph of FIG. 1. The time vector heterogeneous graph contains the same vertices as the heterogeneous graph of FIG. 1. Multiple edges between the vertices of the heterogeneous graph have been replaced by a single edge with an associated time vector. For example, the edges between authors 1 and 2 marked with an asterisk are replaced with a single edge between authors 1 and 2 with the time vector of (0,3,2), which represents a weight of 0 at time 0, a weight of 3 at time 1, and a weight of 2 at time 2.

The community mining system then extracts various features for objects of designated types. For example, if the designated type is a person and the community is potential committee members, then the community mining system extracts features as defined in Table 3.

TABLE 3

| Feature Name | Description | Extraction Method | Class |
|---|---|---|---|
| NumPaper | Total number of papers the author has published. | Query | Publishing |
| AreaPaper | Number of papers the author has published in a specific area. | Query | Publishing |
| NumCoAuthor | Number of co-authors he/she has. | Query | Social |
| D2PCChair | The co-author distance between the author and the conference chair. | Query | Social |
| PCAge | Number of times the author has been a PC member. | Query | Experience |
| BSConf | The PopRank of the best conference he/she has served. | PopRank | Combined |
| AuthorRank | The PopRank of the author as a researcher. | PopRank | Publishing |
| ExpertRank | The PopRank of the author as an expert in specific area. | PopRank | Publishing |

Each row of Table 3 includes feature name, feature description, extraction method, and class of a feature. The extraction method indicates how the feature is extracted from the data. The extraction method of "Query" means that the feature can be extracted directly from the data. The extraction method of "PopRank" means that the feature can be extracted using the PopRank algorithm. The PopRank algorithm is described in Nie, Z., Zhang, Y., Wen, J., and Ma, W., "Object-Level Ranking: Bringing Order to Web Objects," WWW, pp. 567-574, 2005. The PopRank algorithm is also described in U.S. patent application Ser. No. 11/106,017, entitled "Method and System for Ranking Objects of Different Object Types" and filed on Apr. 13, 2005, which is hereby incorporated by reference. The PopRank algorithm calculates the popularity of objects based on the popularity of the web pages that contain the objects and an object-level popularity. The PopRank algorithm determines the popularity of web pages that contain the objects. The PopRank algorithm determines the object-level popularity of the objects based on intra-type and inter-type relationships between the objects. The popularity of the objects in a collection of objects with different object types may be represented by the following equation:

$$R_X = \varepsilon R_{EX} + (1-\varepsilon) \sum_{\forall Y} \gamma_{YX} M_{YX}^T R_Y \quad (1)$$

where $R_X$ and $R_Y$ are vectors of popularity scores of objects of types X and Y, $M_{YX}$ is an adjacency matrix for objects of object types X and Y, $m_{yx}$ is $$\frac{1}{Num(y,x)}$$

if there is a link from object y of object type Y to object x of object type X (Num(y,x) denotes the number of links from object y to any objects of object type X) and $m_{yx}$ is 0 otherwise, $\gamma_{YX}$ denotes the popularity propagation factor of the relationship from an object of type Y to an object of type X and $\Sigma_{\forall Y} \gamma_{YX}=1$, $R_{EX}$ is a vector of web popularity scores of objects of type X, and $\varepsilon$ is a damping factor which is the probability that the "random object finder" will get bored with following links of the object relationship graph and start looking for another object through the web graph. The class column identifies the general class of a feature as publishing, experience, social, or some combination.

In one embodiment, the community mining system identifies both snapshot features and delta features. A snapshot feature represents the features of an object at a designated time. For example, the community mining system may generate a series of snapshots with each snapshot representing features extracted from data covering a year. The community mining system may also define that a snapshot covers multiple years. In such a case, the community mining system creates a snapshot for each year that is based on data covering several of the previous years. A delta feature represents the difference in snapshot features. The community mining system may represent delta features by the following equation:

$$\delta_{t_1+1}^i = \frac{f_{t_1+1}^i - f_{t_1}^i}{\max\{f_{t_1+1}^i, f_{t_1}^i\}} \quad (2)$$

where $\delta_{t_1+1} = \{\delta_{t_1+1}^1, \delta_{t_1+1}^2, \ldots \delta_{t_1+1}^k\}$ represents the delta features at time $t_1$ and $F_{t_1} = \{f_{t_1}^1, f_{t_1}^2, \ldots, f_{t_1}^k\}$ and $F_{t_1+1} = \{f_{t_1+1}^1, f_{t_1+1}^2, \ldots, f_{t_1+1}^k\}$ represent the snapshot features at time $t_1$ and $t_1+1$.

The delta features represent the evolution of the relationships over time. For example, the delta features may represent that to be a conference committee member, a person should not only have been active in the area before but also be active at the current time. The snapshot features reflect how active the person is at a particular time, while the delta features reflect how active the person is over a certain time period.

After the features are extracted, the community mining system then trains a community classifier to classify objects of a designated type as being a community member or not. For example, the community mining system trains a classifier to classify persons based on their features as being a potential committee member of a conference. The community mining system collects training data that includes the features of objects that are members or have been members of the community. For example, the community mining system collects training data that includes the features of the persons who have been members of committees at conferences. In particular, the community mining system labels the features of the training data with the best conference for which the person has been a committee member during the time period. The community mining system then trains a classifier.

In one embodiment, the community mining system may use a classifier such as a support vector machine ("SVM Light") as described in Joachims, T., "Making Large-Scale SVM Learning Practical," Advances in Kernel Methods—Support Vector Learning, B. Scholkopf and C. Burgess and A. Smola (ed.), MIT Press, 1999. The community mining system uses a regression version of the algorithm. In general, a support vector machine operates by finding a hyper-surface in the space of possible inputs. The hyper-surface attempts to split the positive examples from the negative examples by maximizing the distance between the nearest of the positive and negative examples to the hyper-surface. This allows for correct classification of data that is similar to but not identical to the training data. Various techniques can be used to train a general support vector machine. One technique uses a sequential minimal optimization algorithm that breaks the large quadratic programming problem down into a series of small quadratic programming problems that can be solved analytically. (See Sequential Minimal Optimization, at http://research.microsoft.com/~jplatt/smo.html.)

To determine the conferences for which a person is a potential committee member, the community mining system generates the features for the person and then uses the conference classifier to identify the conferences. The conference classifier may identify multiple conferences for which a person may be a potential committee member. When multiple conferences are identified for a person, the community mining system then uses a multi-class conference classifier to identify the conference for which that person is best suited to be a committee member. The community mining system may categorize various conferences based on their popularity using the PopRank algorithm. The community mining system then classifies the conferences with similar popularities into a class. For example, the popularities may indicate that there are classes of first-tier, second-tier, and third-tier conferences. The community mining system generates a multi-class conference classifier for each class of conference. The community mining system collects the training data for the conferences in each class that includes features for persons who were committee members of the conferences within each class and labels the features with the conference. The community mining system then trains a multi-class version of an SVM Light as a classifier. When a person is classified by the conference classifier as being a potential committee member of multiple conferences, the community mining system identifies the highest class of those conferences. The community mining system then uses the multi-class conference classifier to identify the conference of that class to which the person is the best suited to be a committee member.

The community mining system may be used in various applications such as to identify conference committee members as described above. The community mining system may be also used to track the evolution of researchers over time and track the evolution of conferences over time. The tracking of the evolution of researchers over time may be used by an academic committee for a research institution to evaluate the research performance of researchers. The community mining system can be used to track the performance of a researcher in terms of publishing ability, social activities, and experience in organizing research conferences. In addition, the community mining system can be used to track the interests and expertise of a researcher. The evolution of well-known researchers can be used as examples to guide junior researchers to be successful researchers. The tracking of the evolution of conferences over time can be used by researchers to determine research directions. The community mining tool can be used to track emerging topics such as when more and more papers about a specific topic are being published or new papers in a particular topic are frequently cited.

The community mining system may provide post-processing to support various constraints of community membership. For example, a conference may strive to select committee members with diverse backgrounds such as without co-author relationships and with different affiliations. The community mining system may represent the potential community members as the vertices of a graph with edges representing various relationships such as co-authorship and various affiliations. The community mining system may seek to identify the persons with the greatest diversity. The community mining system may represent diversity by the following equation:

$$Div(A) = \sum_{\forall a_i \in A, a_j \in A, a_i \neq a_j} MinDis(a_i, a_j) \quad (3)$$

where Div(A) represents the diversity of a set of potential committee members A, A={$a_1, a_2, \ldots, a_k$}, and MinDis($a_1, a_j$) represents the minimum distance between any two potential committee members. As another example, a conference may strive to select committee members with a combined expertise in all the topics covered by the conference. The community mining system may seek to identify the persons that provide the greatest topic coverage. The community mining system may represent coverage by the following equation:

$$Cov(A) \frac{\sum_{i=1}^{|topic|} MaxTopic_i(a_j)}{|topic|} \quad (4)$$

where MaxTopic($a_j$) represents the maximum number of topics of the conference for which potential committee member $a_j$ is an expert. As another example, a conference may strive to select committee members who are "rising stars" in their particular area. The community mining system may identify rising stars as persons who have an average delta feature value larger than a user-defined threshold. The community mining system may represent diversity, coverage, and rising stars as a multi-objective optimization problem.

Figure 3:
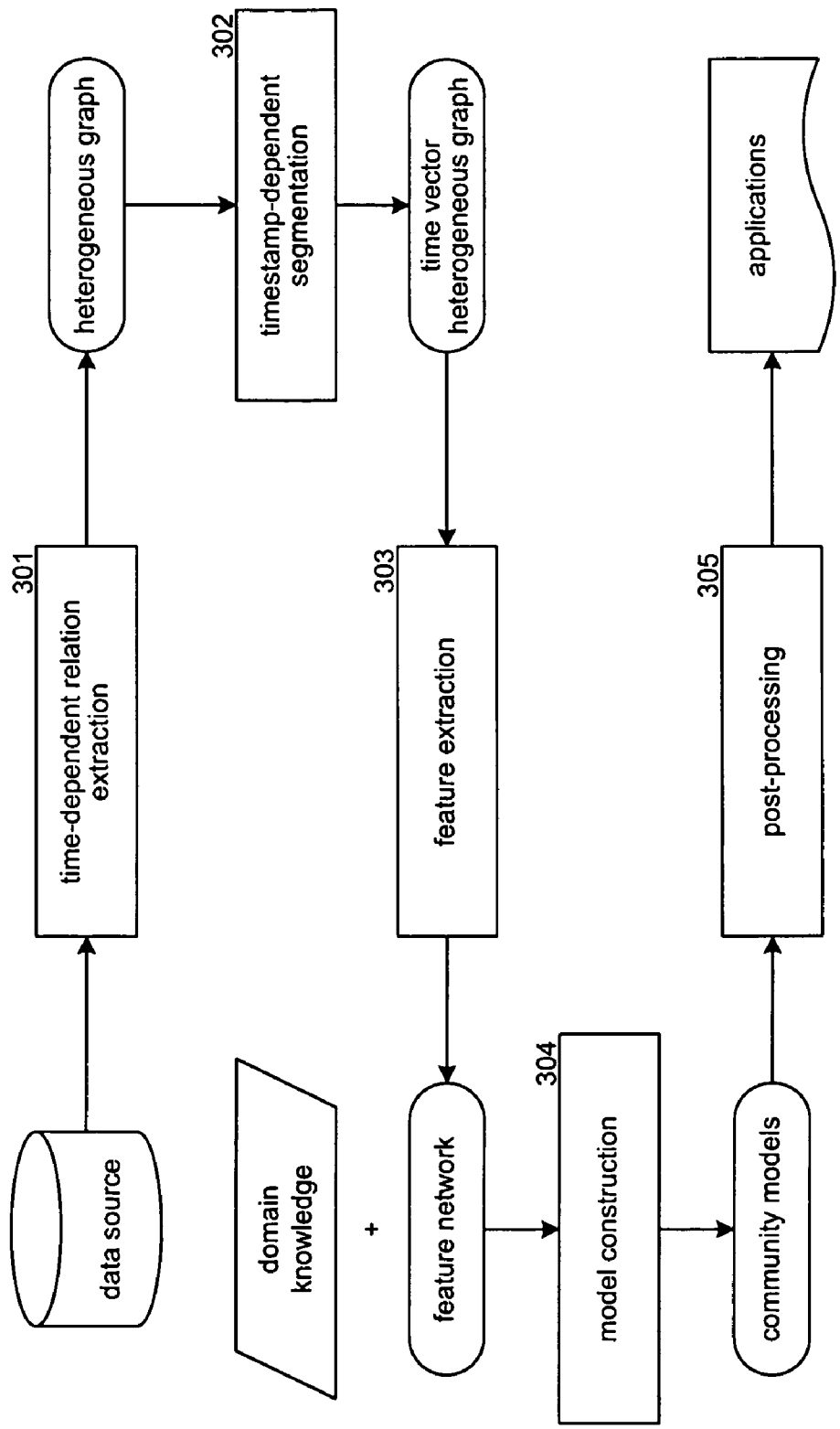
FIG. 3 is a block diagram that illustrates the overall processing of the community mining system in one embodiment.

FIG. 3 is a block diagram that illustrates the overall processing of the community mining system in one embodiment. The community mining system includes a time-dependent relation extraction process 301, a timestamp-dependent segmentation process 302, a feature extraction process 303, a model construction process 304, and a post-processing process 305. The time-dependent relation extraction process inputs the data source and generates a heterogeneous graph. The timestamp-dependent segmentation process inputs the heterogeneous graph and generates a time vector heterogeneous graph. The feature extraction process inputs the time vector heterogeneous graph and outputs a feature network that indicates the features of the objects that are time-dependent. The model construction process inputs the feature network and domain knowledge, such as training data, and generates a model for the community. The post-processing process inputs the community model and applies the post-processing constraints (e.g., diversity) to generate the community mining information.

Figure 4:
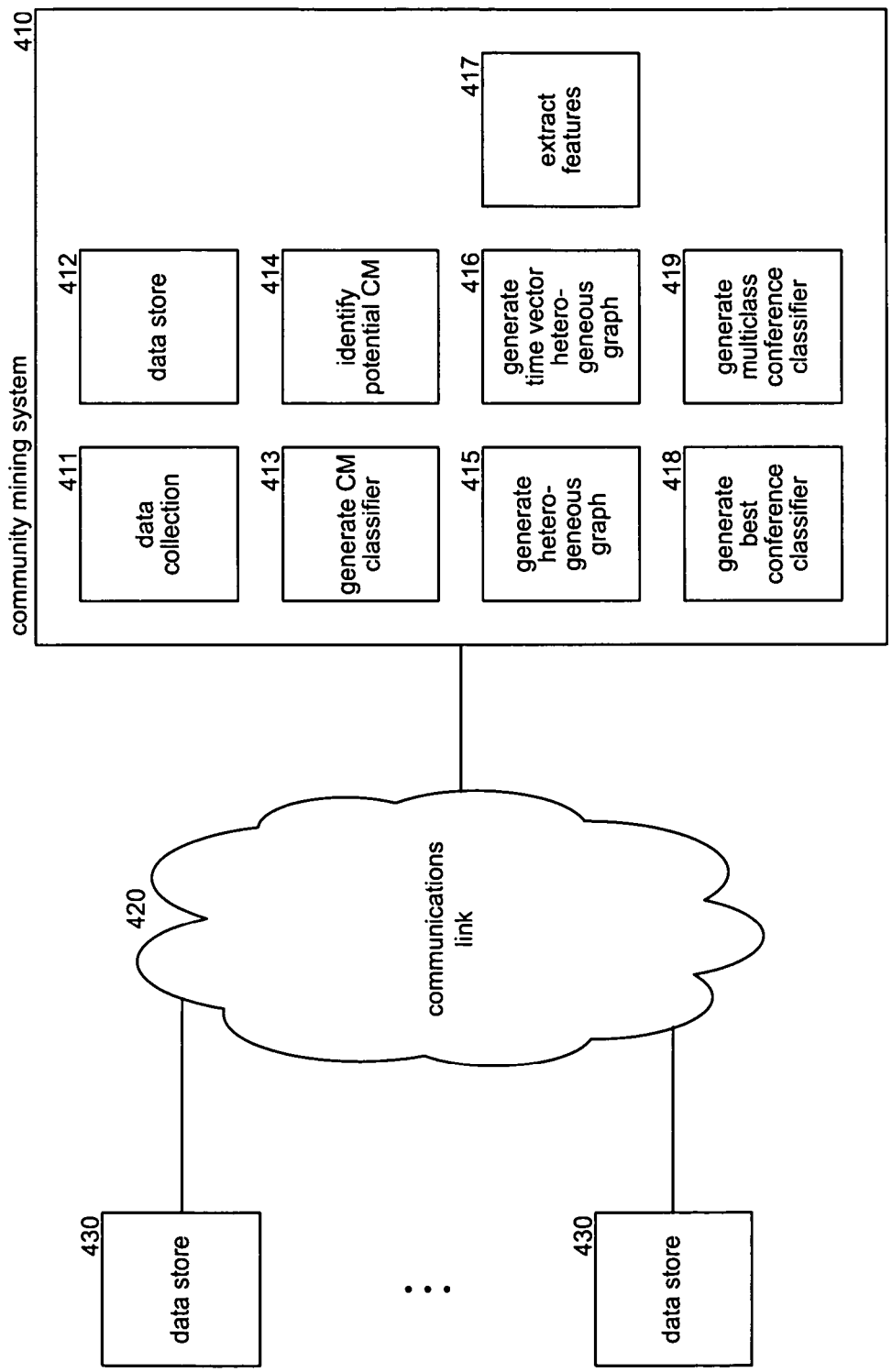
FIG. 4 is a block diagram that illustrates components of the community mining system in one embodiment.

FIG. 4 is a block diagram that illustrates components of the community mining system in one embodiment. The community mining system 410 is connected via communications link 420 to various data stores 430. The community mining system includes a data collection component 411 and data store 412. The data collection component collects data from the various data sources and stores the data in the local data store. The community mining system also includes a generate committee member classifier component 413 and an identify potential committee members component 414. The generate committee member classifier component generates a conference classifier and a multi-class conference classifier based on the data of the data store. The identify potential committee members component uses the generated classifiers to identify potential committee members. The generate committee member classifier component invokes a generate heterogeneous graph component 415, a generate time vector heterogeneous graph component 416, an extract features component 417, a generate best conference classifier component 418, and a generate multi-class conference classifier component 419. Each of these components performs the function as suggested by its name.

The computing device on which the community mining system is implemented may include a central processing unit, memory, input devices (e.g., keyboard and pointing devices), output devices (e.g., display devices), and storage devices (e.g., disk drives). The memory and storage devices are computer-readable media that may contain instructions that implement the community mining system. In addition, the data structures and message structures may be stored or transmitted via a data transmission medium, such as a signal on a communications link. Various communications links may be used, such as the Internet, a local area network, a wide area network, or a point-to-point dial-up connection.

The community mining system may be implemented in various operating environments that include personal computers, server computers, multiprocessor systems, microprocessor-based systems, programmable consumer electronics, network PCs, minicomputers, mainframe computers, distributed computing environments that include any of the above systems or devices, and the like.

The community mining system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
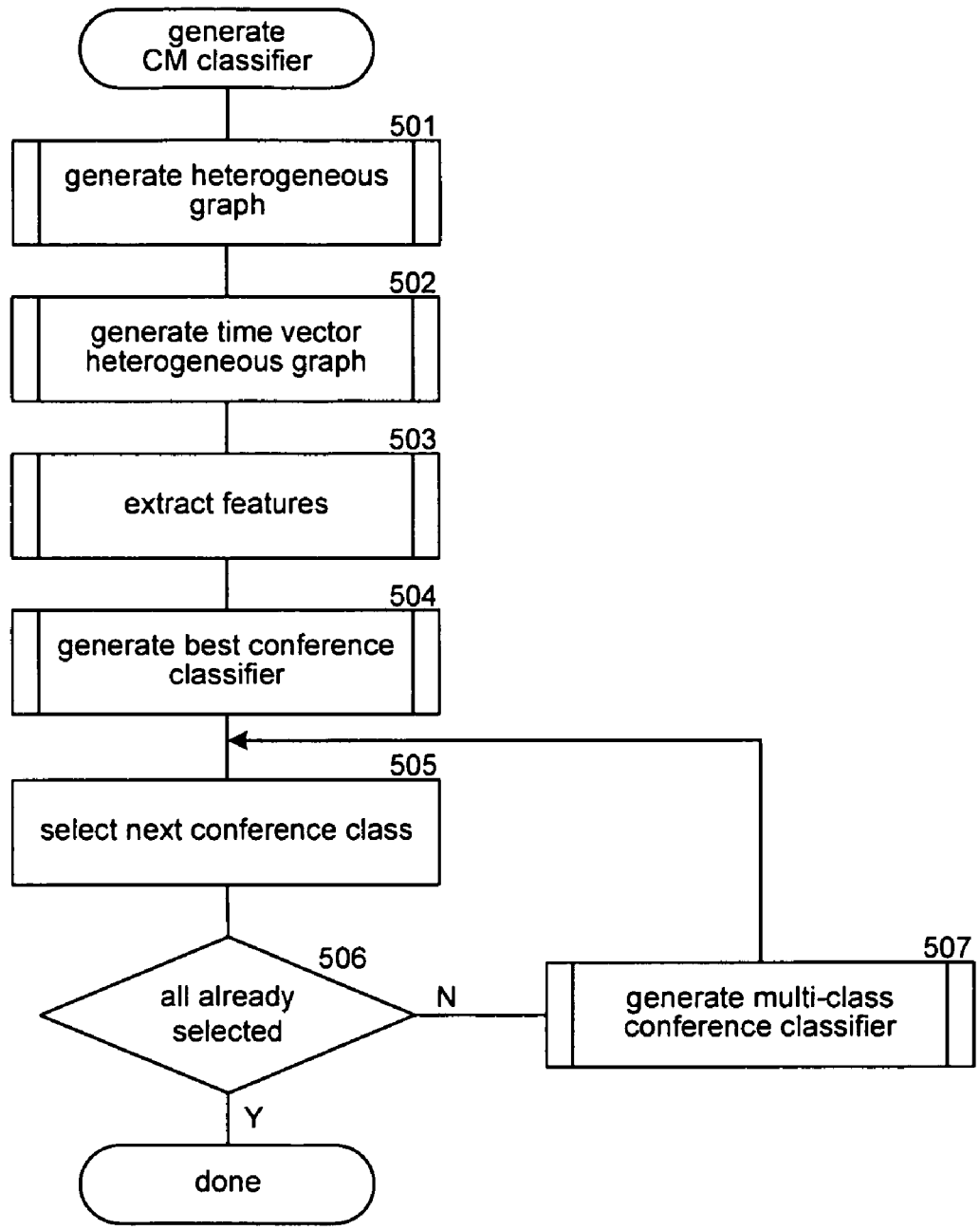
FIG. 5 is a flow diagram that illustrates the processing of the generate committee member classifier component of the community mining system in one embodiment.

FIG. 5 is a flow diagram that illustrates the processing of the generate committee member classifier component of the community mining system in one embodiment. The component is an implementation of the generate community member classifier component. In block 501, the component invokes the generate heterogeneous graph component to generate a heterogeneous graph for persons, papers, and conferences and their relationships. In block 502, the component invokes the generate time vector heterogeneous graph component to generate a time vector heterogeneous graph corresponding to the generated heterogeneous graph. In block 503, the component invokes the extract features component to extract the features associated with each person based on the time vector heterogeneous graph. In block 504, the component invokes the generate best conference classifier to generate the conference classifier. In blocks 505-507, the component loops generating a multi-class conference classifier for each class of conferences. In block 505, the component selects the next class. In decision block 506, if all the conference classes have already been selected, then the component completes, else the component continues at block 507. In block 507, the component invokes the generate multi-class conference classifier component to generate a classifier for the selected class. The component then loops to block 505 to select the next conference class.

Figure 6:
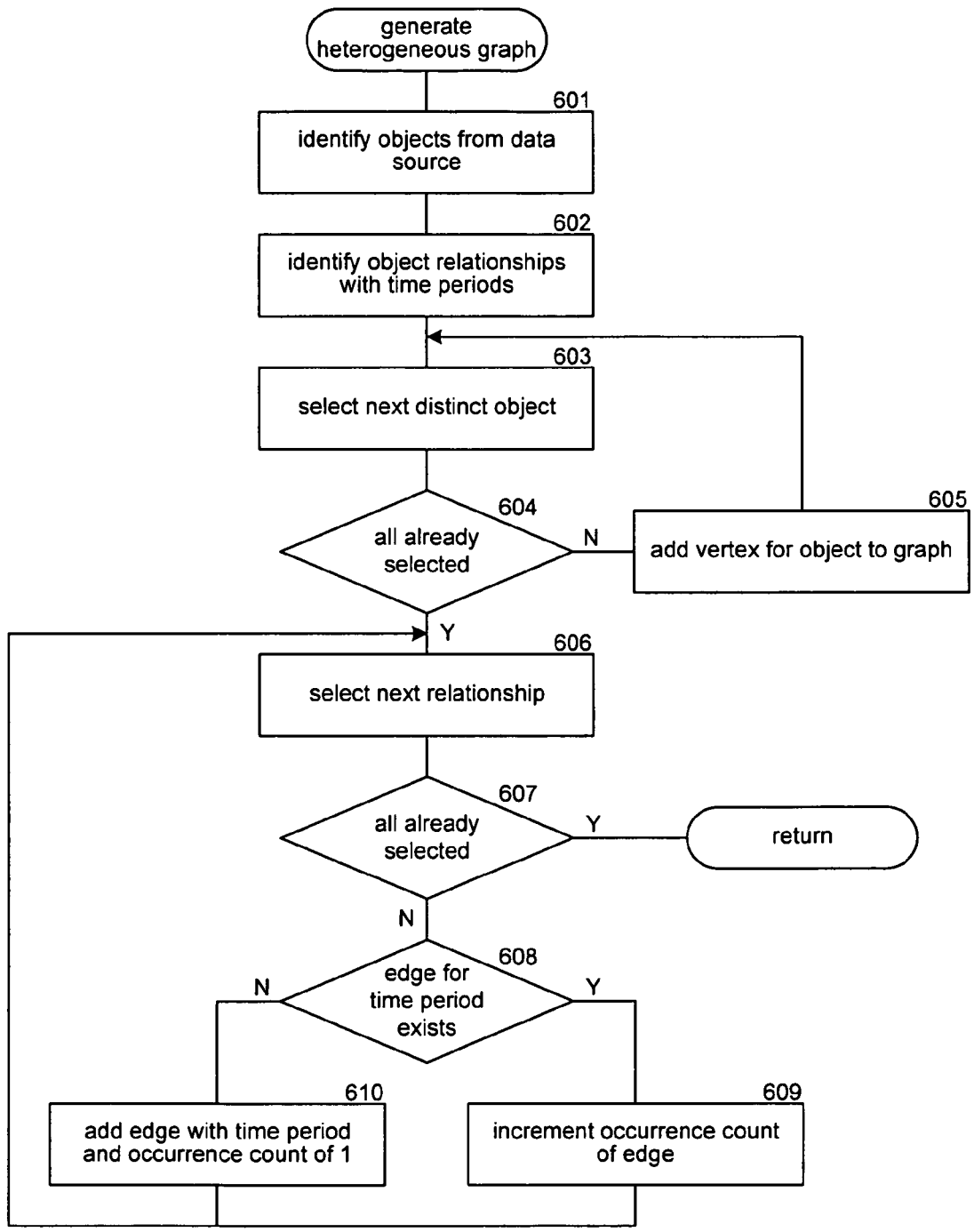
FIG. 6 is a flow diagram that illustrates the processing of the generate heterogeneous graph component of the community mining system in one embodiment.

FIG. 6 is a flow diagram that illustrates the processing of the generate heterogeneous graph component of the community mining system in one embodiment. In block 601, the component identifies the objects from the data source that include persons, papers, and conferences. In block 602, the component identifies the object relationships and their associated time periods. In blocks 603-605, the component loops adding vertices to the heterogeneous graph. In block 603, the component selects the next distinct object that has been identified. In decision block 604, if all the distinct objects have already been selected, then the component continues at block 606, else the component continues at block 605. In block 605, the component adds a vertex for the selected object to the heterogeneous graph and then loops to block 603 to select the next distinct object. In blocks 606-610, the component loops adding edges representing relationships to the heterogeneous graph. In block 606, the component selects the next relationship. In decision block 607, if all the relationships have already been selected, then the heterogeneous graph is complete and the component returns, else the component continues at block 608. In decision block 608, if the edge for the selected relationship for its time period already has been added to the graph, then the component continues at block 609, else the component continues at block 610. In block 609, the component increments the occurrence count or weight of the edge. In block 610, the component adds to the graph an edge for that time period with an occurrence count or weight of 1. The component then loops to block 606 to select the next relationship.

Figure 7:
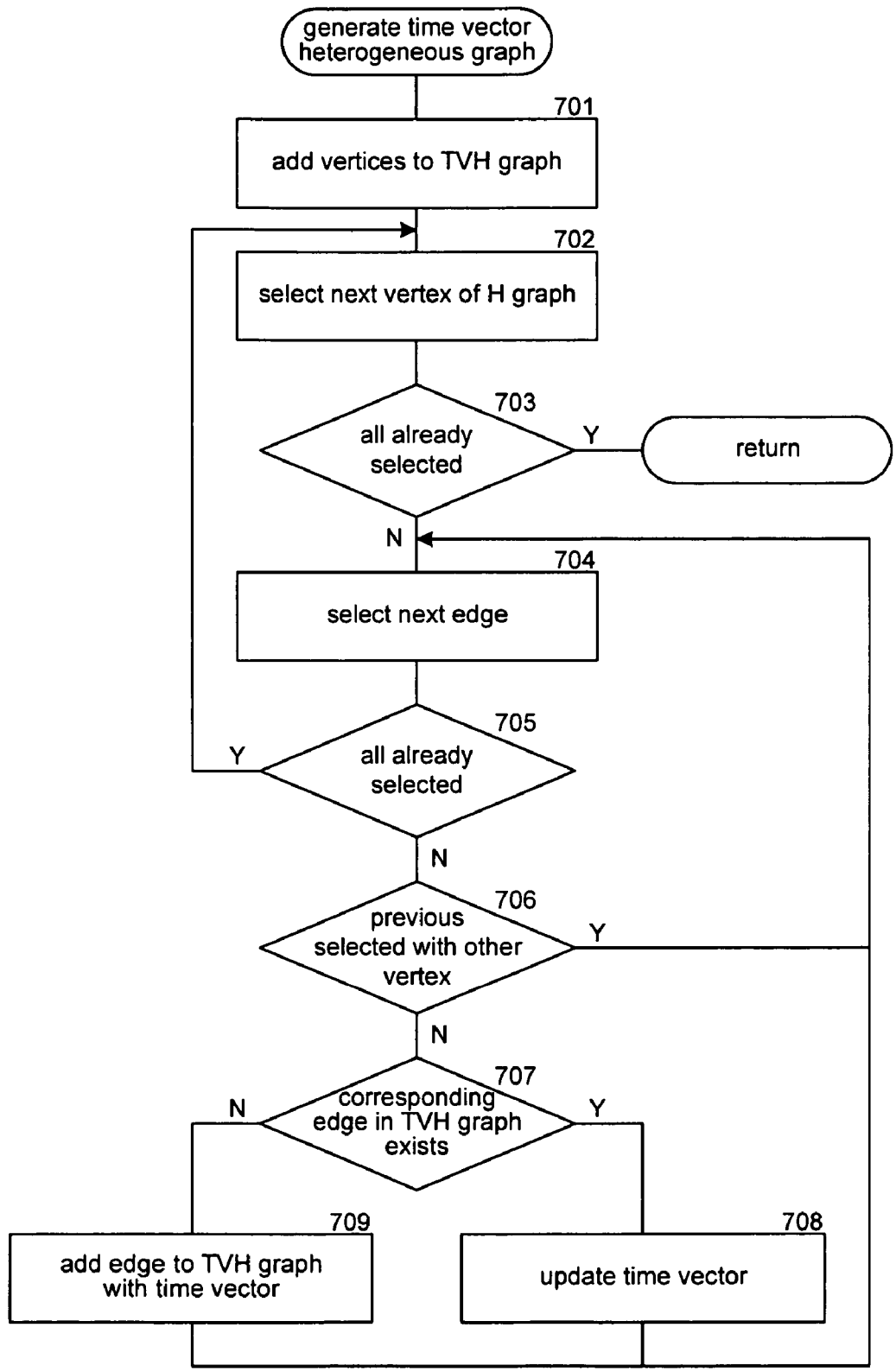
FIG. 7 is a flow diagram that illustrates the processing of the generate time vector heterogeneous graph component of the community mining system in one embodiment.

FIG. 7 is a flow diagram that illustrates the processing of the generate time vector heterogeneous graph component of the community mining system in one embodiment. In block 701, the component adds vertices to the time vector heterogeneous graph corresponding to the vertices of the heterogeneous graph. In blocks 702-709, the component loops adding edges and updating associated time vectors. In block 702, the component selects the next vertex of the heterogeneous graph. In decision block 703, if all the vertices of the heterogeneous graph have already been selected, then the component returns, else the component continues at block 704. In block 704, the component selects the next edge of the selected vertex. In decision block 705, if all the edges of the selected vertex have already been selected, then the component loops to block 701 to select the next vertex of the heterogeneous graph, else the component continues at block 706. In decision block 706, if the selected edge was previously selected for another vertex, then the component loops to block 704 to select the next edge, else the component continues at block 707. In decision block 707, if the corresponding edge exists in the time vector heterogeneous graph, then the component continues at block 708, else the component continues at block 709. In block 708, the component updates the time vector of the existing edge. In block 709, the component adds an edge to the time vector heterogeneous graph with an initial time vector based on the time period of the selected edge. The component then loops to block 704 to select the next edge.

Figure 8:
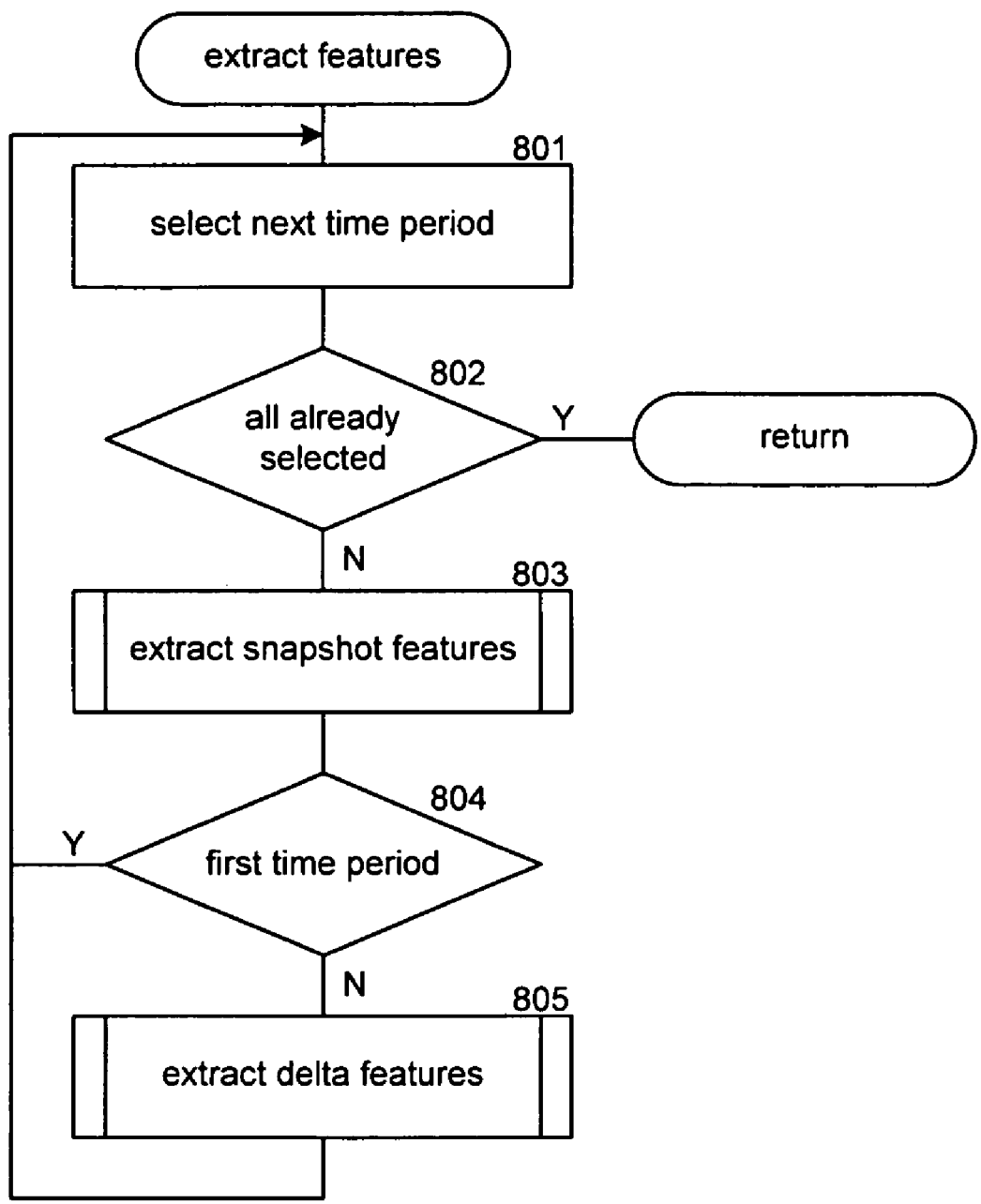
FIG. 8 is a flow diagram that illustrates the processing of the extract features component of the community mining system in one embodiment.

FIG. 8 is a flow diagram that illustrates the processing of the extract features component of the community mining system in one embodiment. The component loops selecting time periods and extracting snapshot features and delta features. In block 801, the component selects the next time period. In decision block 802, if all the time periods have already been selected, then the component returns, else the component continues at block 803. In block 803, the component invokes an extract snapshot features component. In decision block 804, if the first time period is selected, then the component cannot calculate the delta and the component loops to block 801 to select the next time period, else the component continues at block 805. In block 805, the component invokes an extract delta features component and then loops to block 801 to select the next time period.

Figure 9:
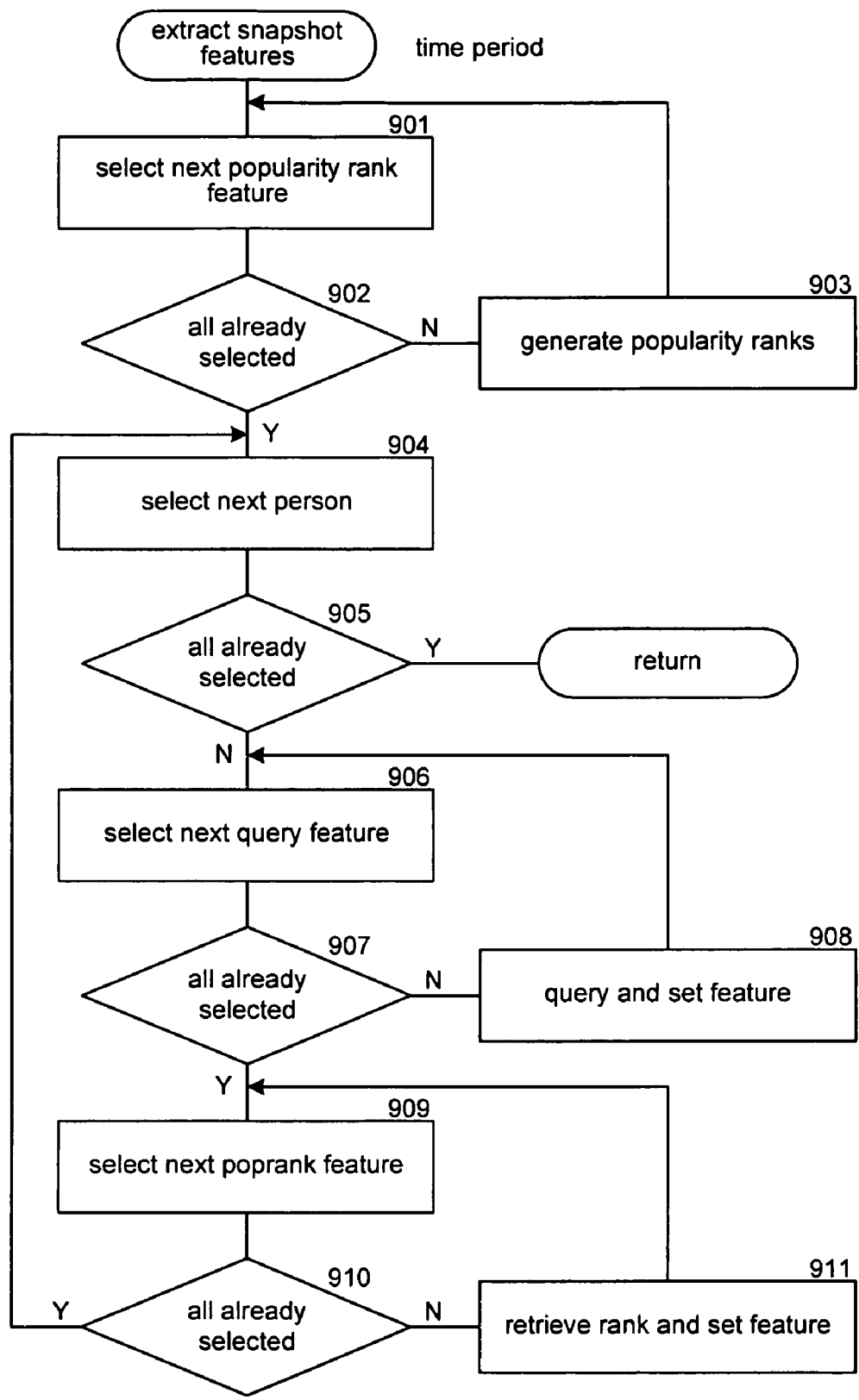
FIG. 9 is a flow diagram that illustrates the processing of the extract snapshot features component of the community mining system in one embodiment.

FIG. 9 is a flow diagram that illustrates the processing of the extract snapshot features component of the community mining system in one embodiment. The component is passed a time period and extracts snapshot features for that time period. In blocks 901-903, the component loops generating the desired popularity ranks. In block 901, the component selects the next popularity rank feature. In decision block 902, if all the popularity rank features have already been selected, then the component continues at block 904, else the component continues at block 903. In block 903, the component generates the popularity ranks for the selected feature and then loops to block 901 to select the next popularity rank feature. In block 904, the component selects the next person. In decision block 905, if all the persons have already been selected, then the component returns, else the component continues at block 906. In blocks 906-908, the component loops extracting query features for the selected person. In block 906, the component selects the next query feature. In decision block 907, if all the query features have already been selected, then the component continues at block 909, else the component continues at block 908. In block 908, the component queries the data for the query feature and sets the feature accordingly. The component then loops to block 906 to select the next query feature. In blocks 909-911, the component loops setting the popularity rank features for the selected person. In block 909, the component selects the next popularity rank feature. In decision block 910, if all the popularity rank features have already been selected, then the component loops to block 904 to select the next person, else the component continues at block 911. In block 911, the component retrieves the rank for the selected feature for the selected person and sets the feature accordingly. The component then loops to block 909 to select the next popularity rank feature.

Figure 10:
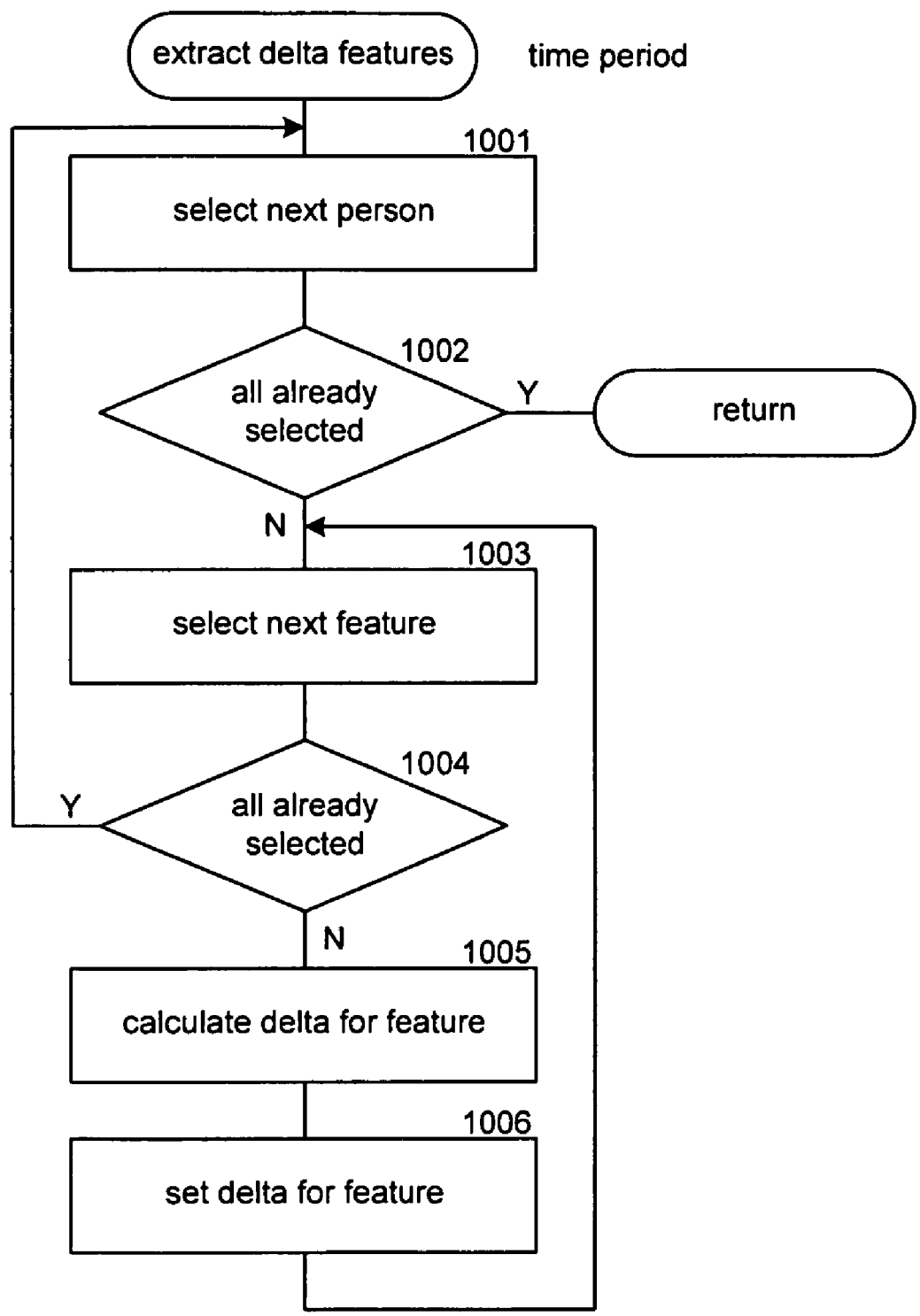
FIG. 10 is a flow diagram that illustrates the processing of the extract delta features component of the community mining system in one embodiment.

FIG. 10 is a flow diagram that illustrates the processing of the extract delta features component of the community mining system in one embodiment. The component is passed a time period and extracts the delta features associated with that time period. In block 1001, the component selects the next person. In decision block 1002, if all the persons have already been selected, then the component returns, else the component continues at block 1003. In block 1003, the component selects the next feature. In decision block 1004, if all the features have already been selected, then the component loops to block 1001 to select the next person, else the component continues at block 1005. In block 1005, the component calculates the delta for the selected feature. In block 1006, the component sets the delta for the selected feature and then loops to block 1003 to select the next feature.

Figure 11:
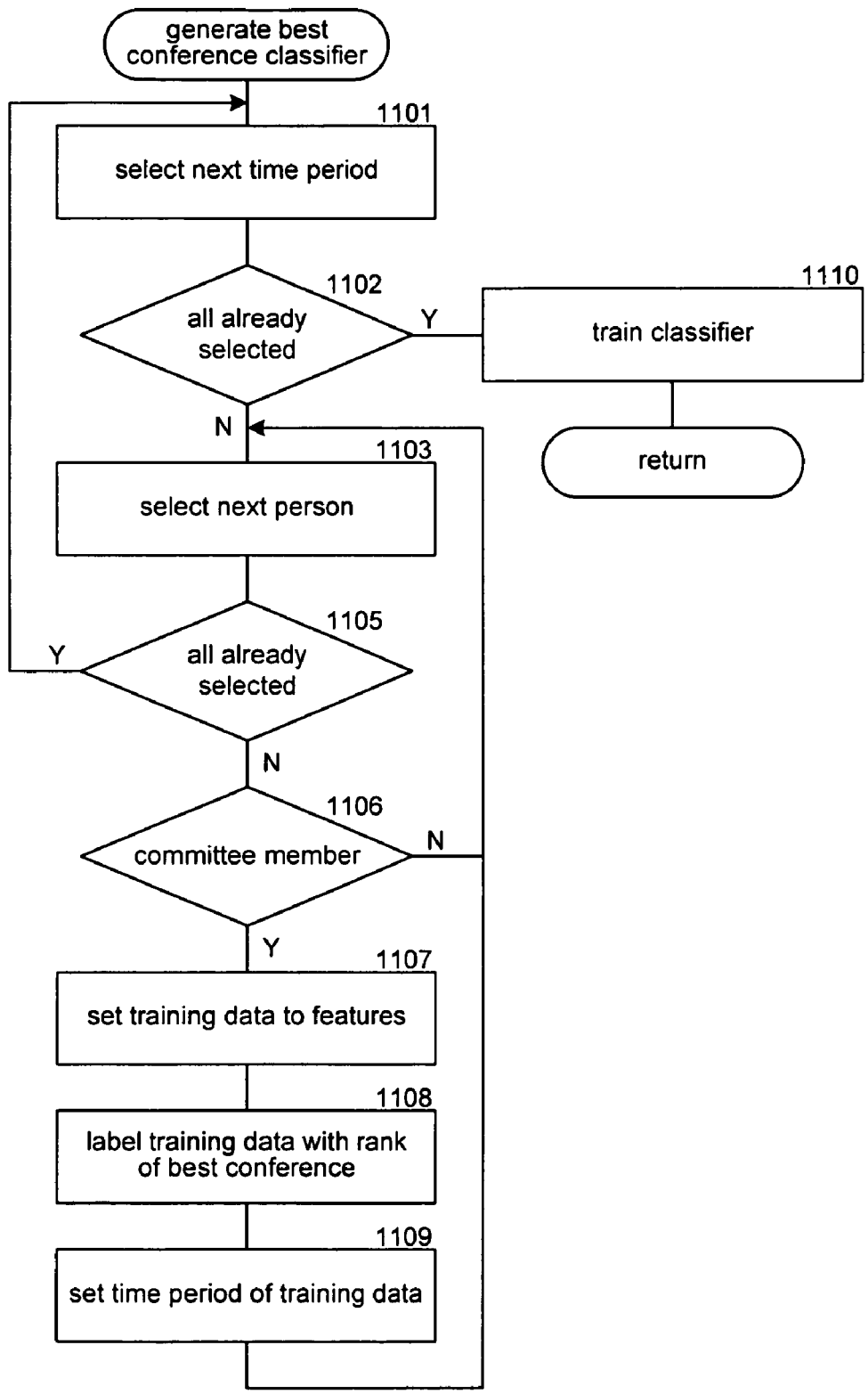
FIG. 11 is a flow diagram that illustrates the processing of the generate best conference classifier component of the community mining system in one embodiment.

FIG. 11 is a flow diagram that illustrates the processing of the generate best conference classifier component of the community mining system in one embodiment. The component generates a conference classifier using the time vector heterogeneous graph. In block 1101, the component selects the next time period. In decision block 1102, if all the time periods have already been selected, then the component continues at block 1110, else the component continues at block 1103. In block 1103, the component selects the next person. In decision block 1105, if all the persons have already been selected, then the component loops to block 1101 to select the next time period, else the component continues at block 1106. In decision block 1106, if the selected person has been a committee member, then the component continues at block 1107, else the component loops to block 1103 to select the next person. In block 1107, the component creates training data based on the features for the selected person. In block 1108, the component labels the training data with the highest ranking conference for which the selected person was a committee member. In block 1109, the component sets the time period for the training data and loops to block 1103 to select the next person. In block 1110, the component trains the conference classifier using the generated training data and then returns.

Figure 12:
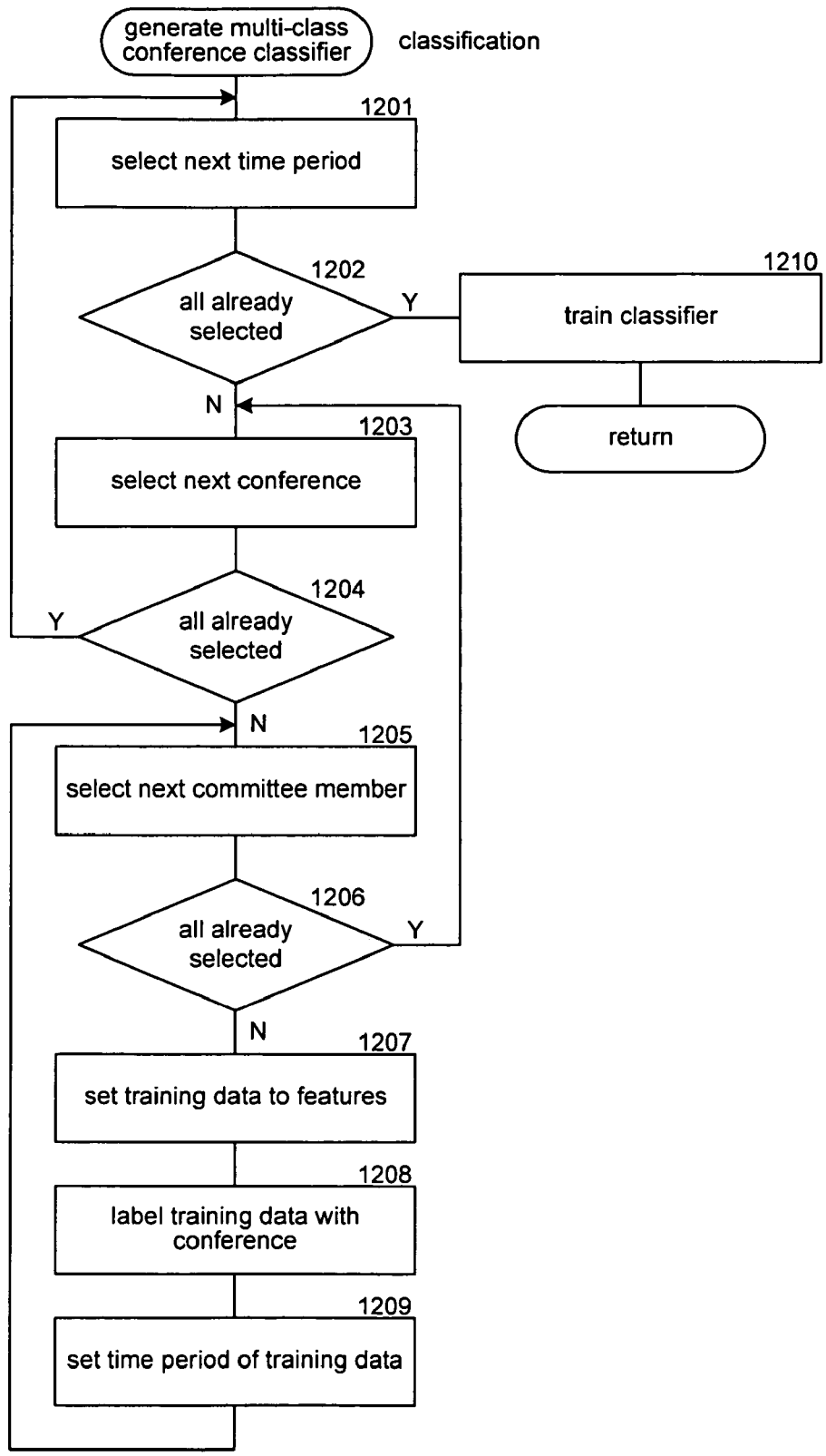
FIG. 12 is a flow diagram that illustrates the processing of the generate multi-class conference classifier component in one embodiment.

FIG. 12 is a flow diagram that illustrates the processing of the generate multi-class conference classifier component in one embodiment. The component generates a multi-class conference classifier based on the time vector heterogeneous graph for the passed classification. In block 1201, the component selects the next time period. In decision block 1202, if all the time periods have already been selected, then the component continues at block 1210, else the component continues at block 1203. In block 1203, the component selects the next conference for the passed classification. In decision block 1204, if all the conferences have already been selected, then the component loops to block 1201 to select the next time period, else the component continues at block 1205. In block 1205, the component selects the next committee member for the selected conference. In decision block 1206, if all the committee members have already been selected, then the component loops to block 1203 to select the next conference, else the component continues at block 1207. In block 1207, the component creates training data based on the features of the selected committee member. In block 1208, the component labels the training data with the selected conference. In block 1209, the component sets the time period of the training data and then loops to block 1205 to select the next committee member. In block 1210, the component trains the multi-class conference classifier using the generated training data and then returns.

Figure 13:
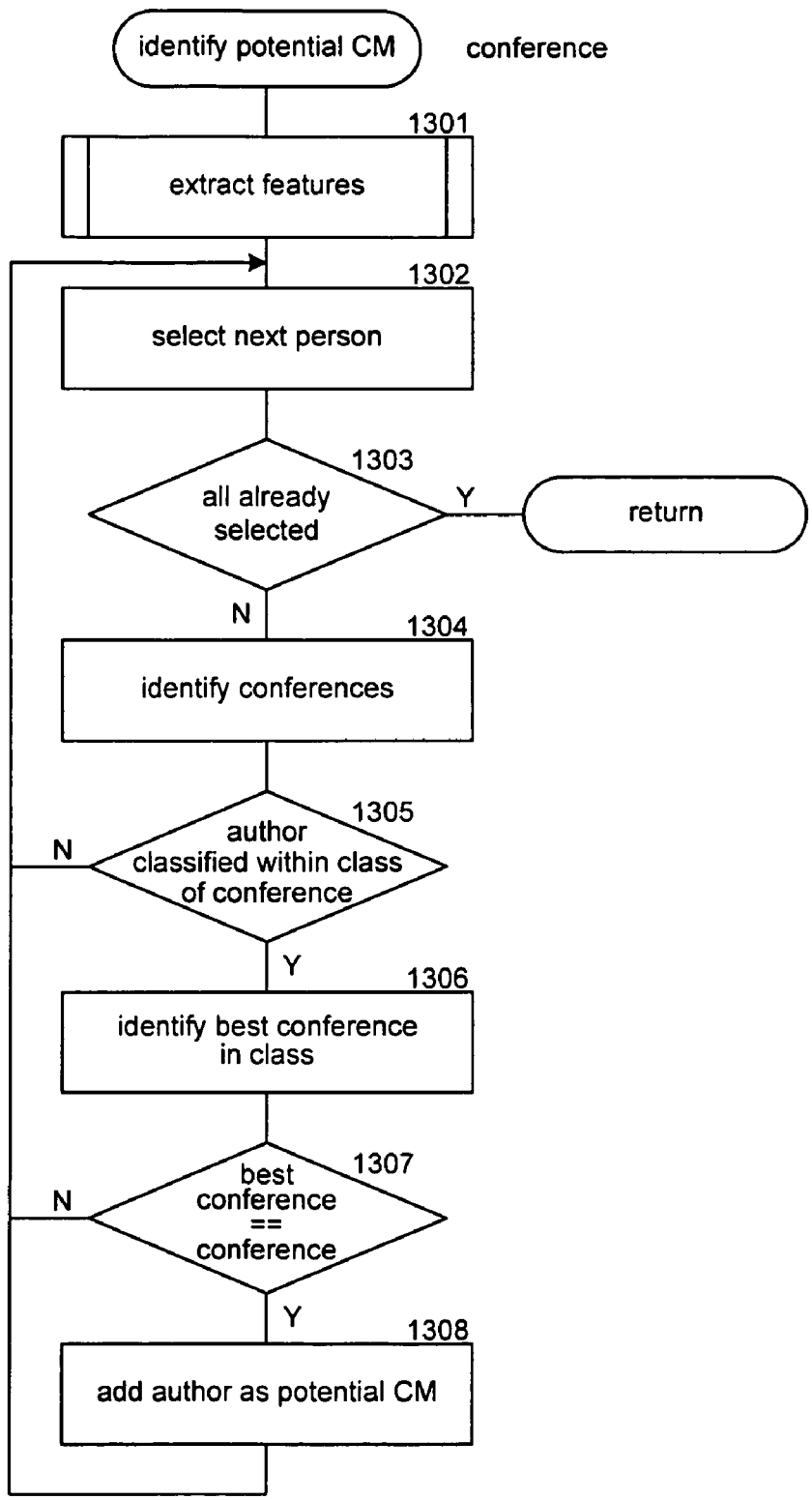
FIG. 13 is a flow diagram that illustrates the processing of the identify potential committee members component of the community mining system in one embodiment.

FIG. 13 is a flow diagram that illustrates the processing of the identify potential committee members component of the community mining system in one embodiment. The component is passed a conference and identifies potential committee members for the conference. In block 1301, the component invokes the extract features component to extract features for the persons of the data store. In block 1302, the component selects the next person. In decision block 1303, if all the persons have already been selected, then the component returns, else the component continues at block 1304. In block 1304, the component identifies conferences for the selected person using the conference classifier. In decision block 1305, if the selected person was classified for multiple conferences, then the component continues at block 1306, else the component loops to block 1302 to select the next person. In block 1306, the component identifies the best conference for the selected person using the multi-class conference classifier. In decision block 1307, if the best conference for the selected person is the passed conference, then the component continues at block 1308, else the component loops to block 1302 to select the next person. In block 1308, the component adds the person as a potential committee member for the passed conference and then loops to block 1302 to select the next person.

Although the subject matter has been described in language specific to structural features and/or methodological acts, it is to be understood that the subject matter defined in the appended claims is not necessarily limited to the specific features or acts described above. Accordingly, the invention is not limited except as by the appended claims.

We claim:

1. A computer system for identifying potential community members of a community, the system comprising:
   a data store that identifies objects of different types and relationships between objects of different types, one type of object representing a person, another type of object representing a community of persons, one relationship indicating that a person is a member of a community, each community having a ranking, each relationship having an associated time;
   a memory storing computer-executable instructions for
      a generate heterogeneous graph component that generates a heterogeneous graph with vertices representing distinct objects and edges representing the relationships between objects, each edge having a time period and a weight; and
      a generate time vector heterogeneous graph component that generates a time vector heterogeneous graph from the heterogeneous graph, the time vector heterogeneous graph having a vertex for each vertex of the heterogeneous graph and an edge between objects representing a relationship between the objects, each edge having a time vector representing the weights of the relationship over time periods;
      a component that extracts features relating to each person from the objects and their relationships as indicated by the generated time vector heterogeneous graph, the extracted features representing evolution of the features over time;
      a generate best community training data component that generates training data for a best community classifier having a label associated with a person, the label indicating potential to be a community member, the training data being generated by, for each time period and each person who is a community member of a community within that time period:
         setting best community training data to the extracted features for that person;
         labeling the best community training data for that person with a rank of the highest ranking community that that person is a community member; and
         setting a time period for the best community training data for that person;
      a train best community classifier component that trains a best community classifier using the best community training data to classify the potential for a person represented by their features to be a community member of a community;
      a generate multi-class community classifier training data component that generates training data for a multi-class community classifier having a label associated with a person, the label indicating potential to be a community member, the multi-class community training data being generated by, for each time period, each community, and community member of a community within that time period:
         setting multi-class community training data to the extracted features for that person;
         labeling the multi-class community training data for that person with the community; and
         setting a time period for the multi-class community training data for that person;
      a train multi-class community classifier component that trains a multi-class community classifier using the multi-class community training data to classify the potential for a person represented by their features to be a community member of a community; and
      a classify person component that classifies a person as a potential community member using the best community classifier and when the person is classified as a potential community member for multiple communities, using the multi-class community classifier to classify the person as a potential community member for a single community; and
   a processor for executing the computer-executable instructions stored in the memory.

2. The system of claim 1 including a classifier that inputs features of a person and classifies the potential for that person to be a community member based on the input features.

3. The system of claim 1 wherein the extract features component extracts snapshot features and delta features.

4. The system of claim 3 wherein an extracted feature is based on a popularity ranking of objects.

5. The system of claim 1 wherein the community members are potential committee members of conferences and wherein the object types include person, paper, and conference and the relationships include person was committee member of conference, paper was cited in paper, paper was published in conference, person was author of paper, and person was co-author with person.

6. The system of claim 1 wherein the community members are potential rising stars in a community and wherein the object types include person, paper, and conference and the relationships include person was committee member of conference, paper was cited in paper, paper was published in conference, person was author of paper, and person was co-author with person.

7. The system of claim 1 wherein the community members share a relationship with other members of the community that is stronger than the relationship with non-members.

8. A computer-readable medium containing instructions for controlling a computer system to identify a community of objects of a designated type, by a method comprising:
   providing indications of objects of different types and of relationships between objects of different types, each relationship having an associated time;
   generating a heterogeneous graph with vertices representing distinct objects and edges representing the relationships between objects, each edge having a time period and a weight;
   generating a time vector heterogeneous graph from the heterogeneous graph, the time vector heterogeneous graph having a vertex for each vertex of the heterogeneous graph and an edge between objects representing a relationship between the objects, each edge having a time vector representing the weights of the relationship over time periods
   extracting features relating to objects of the designated type from the objects and their relationships as indicated by the generated time vector heterogeneous graph, the extracted features representing evolution of the features over time periods;
   providing training data including features of objects within the community, the training data including best community training data generated by, for each time period and each object of the designated type that is within the community for the time period:
  setting best community training data to the extracted features for that object;
  labeling the best community training data for that object with a rank of the highest ranking community that that object is within; and
  setting a time period for the best community training data for that object; and
the training data further including multi-class community classifier training data generated by, for each time period, each community, and object within the community within that time period:
  setting multi-class community training data to the extracted features for that object;
  labeling the multi-class community training data for that object with the community; and
  setting a time period for the multi-class community training data for that object; and
classifying an object of the designated type as being within the community based on closeness of the features of the object to the features of the training data that includes best community training data and multi-class community training data such that when the object is classified as a potential community member for multiple communities based on the best community training data, classifying the object as a potential community member for a single community based on the multi-class community training data.

9. The computer-readable medium of claim 8 wherein the features include snapshot features and delta features.

10. The computer-readable medium of claim 9 wherein an extracted feature is based on a popularity ranking of objects.

11. The computer-readable medium of claim 8 including training a classifier based on the training data to classify objects of the designated type based on their features as being members of the community.

12. A computer system that identifies potential community members of a community, the community members being committee members of a conference, comprising:
  a data store that indicates objects representing persons, conferences, and papers and indicates relationships between objects of different types, each relationship having a time period;
  a memory storing computer-executable instructions for
  a component that generates a heterogeneous graph with vertices representing distinct objects and edges representing the relationships between objects, each edge having a time period and a weight; and
  a component that generates a time vector heterogeneous graph from the heterogeneous graph, the time vector heterogeneous graph having a vertex for each vertex of the heterogeneous graph and an edge between objects representing a relationship between the objects, each edge having a time vector representing the weights of the relationship over time;
  an extract feature component that extracts features relating to persons from the relationships as indicated by the generated time vector heterogeneous graph, the extracted features representing evolution of the features over time;
  a generate best community training data component that generates training data for a best community classifier having a label associated with a person, the label indicating potential to be a community member, the training data being generated by, for each time period and each person who is a community member of a community within that time period:
    setting best community training data to the extracted features for that person;
    labeling the best community training data for that person with a rank of the highest ranking community that that person is a community member; and
    setting a time period for the best community training data for that person;
  a train best community classifier component that trains a best community classifier using the best community training data to classify the potential for a person represented by their features to be a community member of a community;
  a generate multi-class community classifier training data component that generates training data for a multi-class community classifier having a label associated with a person, the label indicating potential to be a community member, the multi-class community training data being generated by, for each time period, each community, and community member of a community within that time period:
    setting multi-class community training data to the extracted features for that person;
    labeling the multi-class community training data for that person with the community; and
    setting a time period for the multi-class community training data for that person;
  a train multi-class community classifier component that trains a multi-class community classifier using the multi-class community training data to classify the potential for a person represented by their features to be a community member of a community; and
  a classify person component that classifies a person as a potential community member using the best community classifier and when the person is classified as a potential community member for multiple communities, using the multi-class community classifier to classify the person as a potential community member for a single community; and
  a processor for executing the computer-executable instructions stored in the memory.

13. The system of claim 12 wherein the features include snapshot features and delta features.

* * * * *

UNITED STATES PATENT AND TRADEMARK OFFICE
CERTIFICATE OF CORRECTION

PATENT NO. : 7,624,081 B2
APPLICATION NO. : 11/392987
DATED : November 24, 2009
INVENTOR(S) : Zhao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 573 days.

Signed and Sealed this

Twenty-sixth Day of October, 2010

David J. Kappos
*Director of the United States Patent and Trademark Office*